July 25, 1933.  D. C. HOFFMANN  1,919,980
CONTROL OF ELECTRIC CIRCUITS
Filed March 19, 1931

Inventor:
Daniel C. Hoffmann,
by Charles E. Tullar
His Attorney.

Patented July 25, 1933

1,919,980

UNITED STATES PATENT OFFICE

DANIEL C. HOFFMANN, OF PHILADELPHIA, PENNSYLVANIA, ASSIGNOR TO GENERAL ELECTRIC COMPANY, A CORPORATION OF NEW YORK

CONTROL OF ELECTRIC CIRCUITS

Application filed March 19, 1931. Serial No. 523,803.

My invention relates to improvements in the control of electric circuits and more particularly to improvements in the control of circuit interrupting devices in protective arrangements whereby the protective apparatus is rendered temporarily inoperative on transient conditions such as occur on closing the circuit of reactive devices; for example, transformers, motors, etc. An object of my invention is to prevent unnecessary and undesired operation of the protective apparatus under such transient conditions without impairing the proper operation of the protective apparatus under the conditions for which it is intended to operate.

My invention will be better understood from the following description when considered in connection with the accompanying drawing and its scope will be pointed out in the appended claims.

Figure 1:
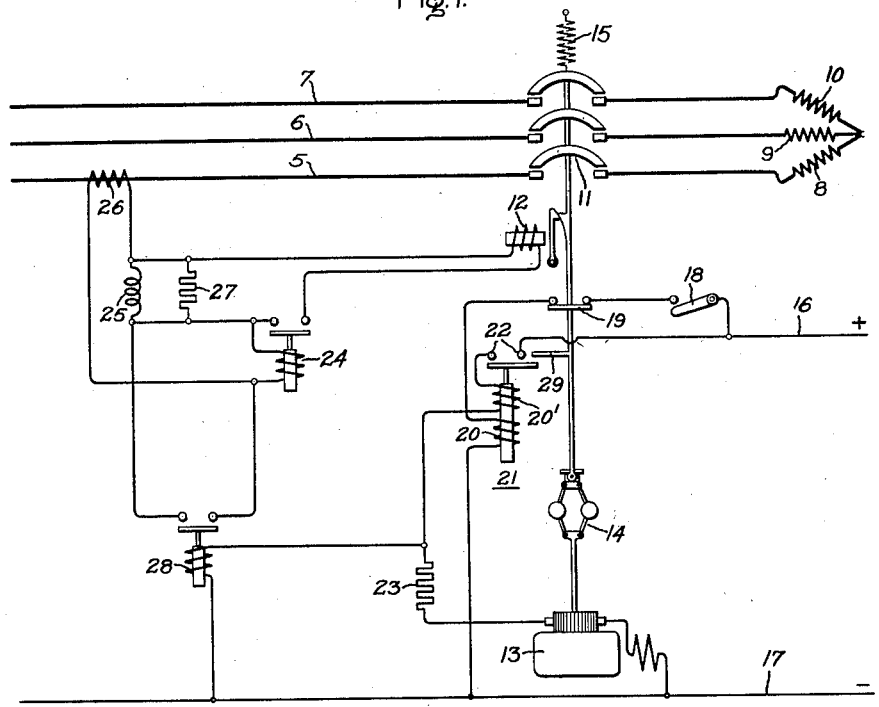
Figure 2:
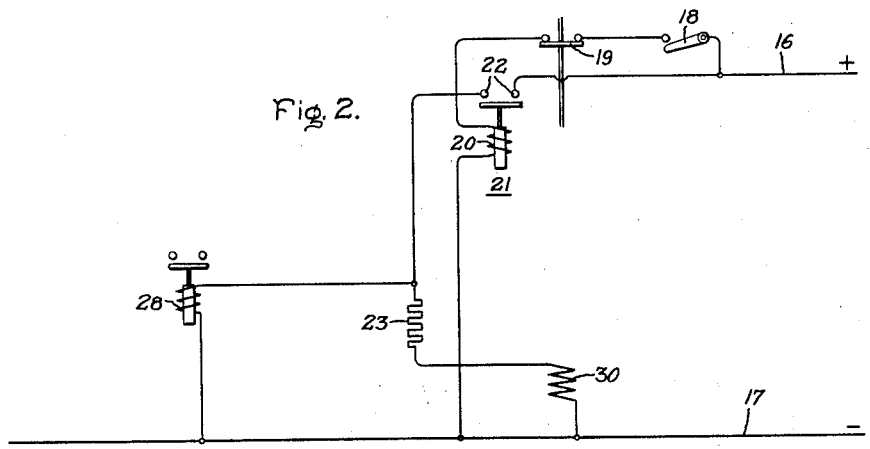

In the accompanying drawing, Fig. 1 illustrates diagrammatically an embodiment of my invention and Fig. 2 illustrates a modification of the embodiment of my invention shown in Fig. 1.

In the embodiment of my invention illustrated in Fig. 1, a three-phase circuit having phase conductors 5, 6 and 7 is arranged to be connected to reactive apparatus schematically illustrated as windings 8, 9 and 10, which may be the windings of one side of a transformer, by suitable circuit interrupting means shown as a latched closed circuit breaker 11 having a trip coil 12. For actuating the circuit breaker 11 to close the circuit any suitable closing means may be employed. The means schematically illustrated in Fig. 1 is of an electromagnetic type wherein a motor 13 drives a centrifugal mechanism 14 to close the circuit breaker 11 against an opening bias shown as a spring 15. Such a closing means is disclosed in United States Letters Patent 1,654,518, granted December 27, 1927, on an application of L. S. Walle. Those skilled in the art will, of course, understand that a solenoid mechanism, examples of which are well known to the art, may also be employed.

The energization of the closing means may be effected from control busses 16 and 17 by means of a control circuit shown as including a control switch 18, a circuit breaker auxiliary switch 19 which is closed when the circuit breaker is open and vice versa, and a pick-up winding 20 of a control relay 21. Through its contacts 22, the control relay 21 controls the circuit of the motor 13 and also the circuit of its own sealing-in winding 20'. In some cases, the motor circuit may include current limiting means such as a resistance 23.

For controlling the circuit breaker 11 so as to effect the opening thereof on the occurrence of abnormal circuit conditions, any suitable protective relay means, examples of which are well known to the art, may be employed, the particular means illustrated being of the so-called direct trip overcurrent type. As shown, this means includes an overcurrent relay 24 which is connected in series with an inductive reactance device 25 across the secondary of a current transformer 26 in phase conductor 5, only one phase being shown for clearness. The trip coil 12 of the circuit breaker 11 is connected across the reactor 25 through the normally open contacts of the overcurrent relay 24 so as to be energized in accordance with the voltage drop across the reactor upon the occurrence of the predetermined line current to which the relay 24 responds. The reactor 25 may be arranged to saturate at some predetermined value of current in the power circuit. In order to reduce the danger from voltage peaks, especially with high currents, a current limiting resistor 27 may be connected in parallel with the reactor 25.

In order to prevent the tripping of the circuit breaker by reason of the transient inrush current which follows the closing of the circuit breaker, I provide means including a device which is connected in circuit with the closing means to be energized substantially simultaneously therewith for preventing the opening of the circuit breaker while the closing means is energized. As shown, this device includes a relay 28, which has its winding connected in parallel with the motor 13 and which is arranged to render the fault responsive relay means ineffective, for example by short-circuiting the winding of the relay 24 until the motor circuit is open at the control relay contacts 22. This may be accomplished by providing the circuit breaker operating mechanism with a projecting member 29 which upon the latching of the circuit breaker mechanically retracts the relay armature against the pull of its sealing-in winding 20'.

To close the circuit breaker 11, the control switch 18 is closed thereby energizing the control relay 21 and through the contacts 22 thereof the motor 13 and the relay 28. This relay, by closing its contacts, short-circuits the overcurrent relay 24 and thus prevents energization of the trip coil 12. Upon the opening of the circuit breaker auxiliary switch 19, the pick-up coil 20 of relay 21 is deenergized and after the latching of the circuit breaker, the arm 29 effects the opening of the relay contacts 22. Subsequently, the relay 28 opens its contacts and the normal protection of the fault responsive relay means 24 is restored.

In the embodiment of my invention shown in Fig. 2, the relay 21 has only the pick-up winding 20 whose circuit includes the circuit breaker auxiliary switch 19 so that this relay is deenergized at the desired instant in the circuit closing operation of the circuit breaker 11. The closing means is indicated merely as a winding 30 which may be that of a motor mechanism or of a solenoid mechanism.

It will be apparent to those skilled in the art that where a motor mechanism is employed, especially in conjunction with a centrifugal device, the mechanism will continue to rotate after its energizing circuit is opened. Consequently, there is generated a counter electromotive force which tends to maintain the relay 28 energized for a longer time. This is more pronounced where a motor having a shunt field is employed. Similarly, in case of a solenoid mechanism, the counter electromotive force or inductive kick of the coil upon the opening of its circuit at the contacts 22 discharges into the parallel connected relay 28 thereby tending to maintain this relay energized for a longer time. Thus, in either case, the fault responsive means is rendered further ineffective until the counter electromotive force of the closing means disappears. This feature is desirable where the transient inrush period is of any considerable duration.

While I have shown and described my invention in considerable detail, I do not desire to be limited to the exact arrangements shown but seek to cover in the appended claims all those modifications that fall within the true spirit and scope of my invention.

What I claim as new and desire to secure by Letters Patent of the United States is:

1. In combination, an electric circuit, circuit interrupting means for said circuit, closing means for actuating said circuit interrupting means to close said circuit, means responsive to abnormal conditions of said circuit to effect the opening of said circuit interrupting means and means including a device connected to have its energization initiated substantially simultaneously with the energizing of said closing means for rendering said abnormal condition responsive means inoperative while the closing means is energized.

2. In combination, an electric circuit, circuit interrupting means for said circuit, electromagnetic closing means for actuating said circuit interrupting means to close said circuit, fault responsive means for effecting the opening of said circuit interrupting means and means including a winding connected in circuit with said electromagnetic closing means to have its energization initiated substantially simultaneously with the energizing of the closing means for rendering said fault responsive means inoperative while the closing means is energized.

3. In combination, an electric circuit, circuit interrupting means for said circuit, electromagnetic closing means for actuating said circuit interrupting means to close said circuit, means responsive to abnormal conditions of said circuit to effect the opening of said circuit interrupting means, and means including a device connected in circuit with said electromagnetic closing means to have its energization initiated simultaneously with the energizing of the closing means for rendering said abnormal condition responsive means inoperative while the closing means is energized.

4. In combination, an electric circuit, circuit interrupting means for said circuit, electromagnetic closing means for actuating said circuit interrupting means to close said circuit, means responsive to abnormal conditions of said circuit to effect the opening of said circuit interrupting means and means including a device connected in parallel with said electromagnetic closing means to have its energization initiated substantially simultaneously with the energizing of the closing means for rendering said abnormal condition responsive means inoperative while the closing means is energized.

5. In combination, an electric circuit, circuit interrupting means for said circuit, electromagnetic closing means for actuating said circuit interrupting means to close said circuit, means for effecting the opening of said circuit interrupting means including a protective relay having a winding connected to be energized from said circuit and means for rendering said relay ineffective while said closing means is energized including another relay having a winding connected in parallel with the winding of said electromagnetic closing means to be energized substantially simultaneously therewith, said other relay being arranged upon energization thereof to short-circuit the winding of said protective relay.

6. In combination, an electric circuit, circuit interrupting means for said circuit, electromagnetic closing means for actuating said circuit interrupting means to close said circuit, means for deenergizing said closing means upon closure of said circuit interrupting means, fault responsive means for effecting the opening of said circuit interrupting means and means for rendering said fault responsive means ineffective to open said circuit interrupting means while the closing means is energized including a winding connected in circuit with said electromagnetic closing means to be energized substantially simultaneously therewith and to be energized by the counter electromotive force of said electromagnetic closing means upon deenergization thereof whereby to render said fault responsive means further ineffective until the counter electromotive force of the closing means disappears.

7. In combination, an electric circuit, circuit interrupting means for said circuit, electromagnetic closing means for actuating said circuit interrupting means to close said circuit, means for deenergizing said closing means upon closure of said circuit interrupting means, means for effecting the opening of said circuit interrupting means including a protective relay having a winding connected to be energized from said circuit and means for rendering said relay ineffective while said closing means is energized, including another relay operative when energized to short-circuit the winding of said protective relay, said other relay having a winding connected in parallel with said electromagnetic closing means to be energized substantially simultaneously therewith and to be energized by the counter electromotive force of said electromagnetic closing means upon deenergization thereof whereby to render said protective relay further ineffective until the counter electromotive force of the closing means disappears.

DANIEL C. HOFFMANN.